US012741848B2

(12) United States Patent
Serkh et al.

(10) Patent No.: US 12,741,848 B2
(45) Date of Patent: Sep. 22, 2026

(54) ELONGATION BASED MONITORING OF TENSION MEMBERS

(71) Applicant: OTIS ELEVATOR COMPANY, Farmington, CT (US)

(72) Inventors: Alexander Serkh, Troy, MI (US); Bardia Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 603 days.

(21) Appl. No.: 18/235,977

(22) Filed: Aug. 21, 2023

(65) Prior Publication Data

US 2025/0066160 A1 Feb. 27, 2025

(51) Int. Cl.
*B66B 7/12* (2006.01)
*B66B 5/00* (2006.01)

(52) U.S. Cl.
CPC .......... *B66B 7/1207* (2013.01); *B66B 5/0087* (2013.01)

(58) Field of Classification Search
CPC ............................ B66B 7/1207; B66B 5/0087
See application file for complete search history.

(56) References Cited

U.S. PATENT DOCUMENTS

| | | | | | |
|---|---|---|---|---|---|
| 4,852,263 | A * | 8/1989 | Kerr | G01B 7/046 | 33/735 |
| 5,127,493 | A * | 7/1992 | Yasuda | B66B 11/0055 | 187/406 |
| 5,353,893 | A * | 10/1994 | Sun | B66B 7/068 | 187/412 |
| 5,890,564 | A * | 4/1999 | Olsen | B66B 7/1215 | 187/250 |
| 5,992,574 | A * | 11/1999 | Olsen | B66B 7/1215 | 73/158 |
| 6,223,862 | B1 * | 5/2001 | Barnes | B66B 7/06 | 187/412 |
| 6,412,264 | B1 * | 7/2002 | De Josez | D07B 1/0686 | 57/232 |
| 7,849,666 | B2 * | 12/2010 | Kirth | D07B 1/148 | 57/210 |
| 10,207,898 | B2 * | 2/2019 | Kalliomäki | B66B 5/0018 | |
| 2005/0187052 | A1 * | 8/2005 | Yokoyama | F16H 7/1281 | 474/135 |
| 2006/0232789 | A1 * | 10/2006 | Oh | G01D 5/305 | 356/614 |
| 2009/0320436 | A1 * | 12/2009 | Kirth | D07B 1/148 | 87/1 |
| 2015/0197408 | A1 * | 7/2015 | St. Germain | D07B 1/148 | 340/668 |

(Continued)

FOREIGN PATENT DOCUMENTS

| | | | | |
|---|---|---|---|---|
| EP | 3456674 A1 * | 3/2019 | | B66B 17/12 |
| EP | 3456674 B1 * | 4/2020 | | B66B 17/12 |

(Continued)

*Primary Examiner* — Shawki S Ismail
(74) *Attorney, Agent, or Firm* — Carlson, Gaskey & Olds, P.C.

(57) ABSTRACT

A method and apparatus includes an indicator mark that is located on at least one tension member at a predetermined distance from a fixed point. A visual indication of tension member replacement is provided when the indicator mark approaches a specified distance from the fixed point after a tension member length adjustment.

12 Claims, 2 Drawing Sheets

(56) References Cited

U.S. PATENT DOCUMENTS

| | | | | |
|---|---|---|---|---|
| 2015/0204425 | A1* | 7/2015 | Lindsay | F16M 11/2092 474/117 |
| 2018/0363241 | A1* | 12/2018 | Ernst | B66C 15/06 |
| 2019/0368862 | A1* | 12/2019 | Murray | B65G 15/30 |
| 2022/0063768 | A1* | 3/2022 | Fields | D07B 1/00 |
| 2022/0219739 | A1* | 7/2022 | Pfeifer | B61B 12/022 |

FOREIGN PATENT DOCUMENTS

| | | | | | |
|---|---|---|---|---|---|
| JP | 6491365 | B1 | * | 3/2019 | |
| JP | 2020040813 | A | * | 3/2020 | |
| JP | 2021084796 | A | * | 6/2021 | |
| JP | 7047050 | B1 | * | 4/2022 | B66B 7/1223 |

* cited by examiner

ELONGATION BASED MONITORING OF TENSION MEMBERS

BACKGROUND

Elevator systems are in widespread use for carrying passengers between various levels in buildings, for example. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes. More recently, elevator systems have included other types of suspension members, such as flat belts or other types of ropes that have tension members encased in a compressible polymer jacket.

Traditional round steel ropes were typically inspected using a manual process including manually and visually observing the condition of the outer surfaces of the rope. Coated belts and other coated ropes cannot be inspected that way. Electrical inspection techniques have been developed that include applying electric current to at least some of the tension members and measuring an electrical characteristic, such as resistance, to obtain information indicating a condition of the belt or coated rope. Alternative, more cost-effective, methods of inspection are sought to improve accuracy and reliability.

SUMMARY

An illustrative method includes: marking at least one tension member with an indicator mark at a predetermined distance from a fixed point; adjusting a length of the at least one tension member to accommodate for stretching; and replacing the at least one tension member when the indicator mark approaches a specified distance from the fixed point.

In addition to one or more of the features described above, or as an alternative, the method includes waiting a predetermined time after installation of the at least one tension member during which the at least one tension member has an initial stretching, adjusting the length of the at least one tension member to accommodate for the initial stretching, and subsequently marking the at least one tension member with the indicator mark at the predetermined distance from the fixed point.

In addition to one or more of the features described above, or as an alternative, the method includes reducing the length of the at least one tension member during each adjustment and bringing the indicator mark closer to the fixed point.

In addition to one or more of the features described above, or as an alternative, the predetermined distance from the fixed point is determined based on a plurality of elevator characteristics.

In addition to one or more of the features described above, or as an alternative, the plurality of elevator characteristics include one or more of the length of tension member, expected life of tension member, test data, elevator system layout, and usage pattern.

In addition to one or more of the features described above, or as an alternative, an elevator car is coupled to a counterweight by the at least one tension member, the method further including: after installation, setting an initial buffer distance between a bottom of the counterweight and buffer mounted at a bottom of a hoistway; monitoring a reduction of buffer distance as a result of stretching; and during each adjustment, shortening the length of the at least one tension member until the bottom of the counterweight returns to the initial buffer distance.

In addition to one or more of the features described above, or as an alternative, during each adjustment, the method includes reducing the length of the at least one tension member which brings the indicator mark closer to the fixed point.

In addition to one or more of the features described above, or as an alternative, the fixed point is at an upper end of the at least one tension member.

An illustrative example elevator system includes: an elevator car moveable within a hoistway; at least one tension member that supports the elevator car and facilitates movement of the elevator car in the hoistway; and an indicator mark located on the at least one tension member at a predetermined distance from a fixed point, and wherein a visual indication of tension member replacement is provided when the indicator mark approaches a specified distance from the fixed point after a tension member length adjustment.

In addition to one or more of the features described above, or as an alternative, the at least one tension member has an initial installation condition, and wherein the indicator mark is marked on the at least one tension member after a predetermined time has passed from the initial installation condition during which the at least one tension member has been adjusted accommodate an initial stretching.

In addition to one or more of the features described above, or as an alternative, a length of the at least one tension member is reduced during each adjustment and the indicator mark is brought closer to the fixed point.

In addition to one or more of the features described above, or as an alternative, the predetermined distance from the fixed point is determined based on a plurality of elevator characteristics.

In addition to one or more of the features described above, or as an alternative, the plurality of elevator characteristics include one or more of length of tension member, expected life of tension member, test data, elevator system layout, and usage pattern.

In addition to one or more of the features described above, or as an alternative, the elevator car is coupled to a counterweight by the at least one tension member, and wherein: after installation, an initial buffer distance is set between a bottom of the counterweight and a buffer mounted at a bottom of the hoistway; a reduction of the initial buffer distance as a result of stretching is monitored to provide a current buffer distance; and after each adjustment, a length of the at least one tension member comprises a shortened length and the bottom of the counterweight is at the initial buffer distance.

In addition to one or more of the features described above, or as an alternative, after each adjustment the length of the at least one tension member is reduced, which brings the indicator mark closer to the fixed point.

The various features and advantages of an example embodiment will become apparent to those skilled in the art from the following detailed description. The drawings that accompany the detailed description can be briefly described as follows.

DETAILED DESCRIPTION

Embodiments of this disclosure provide for an elongation based health monitoring of tension members of an elevator system. The health monitoring system is less expensive, more accurate, and more reliable than resistance based monitoring of tension members.

Figure 1:
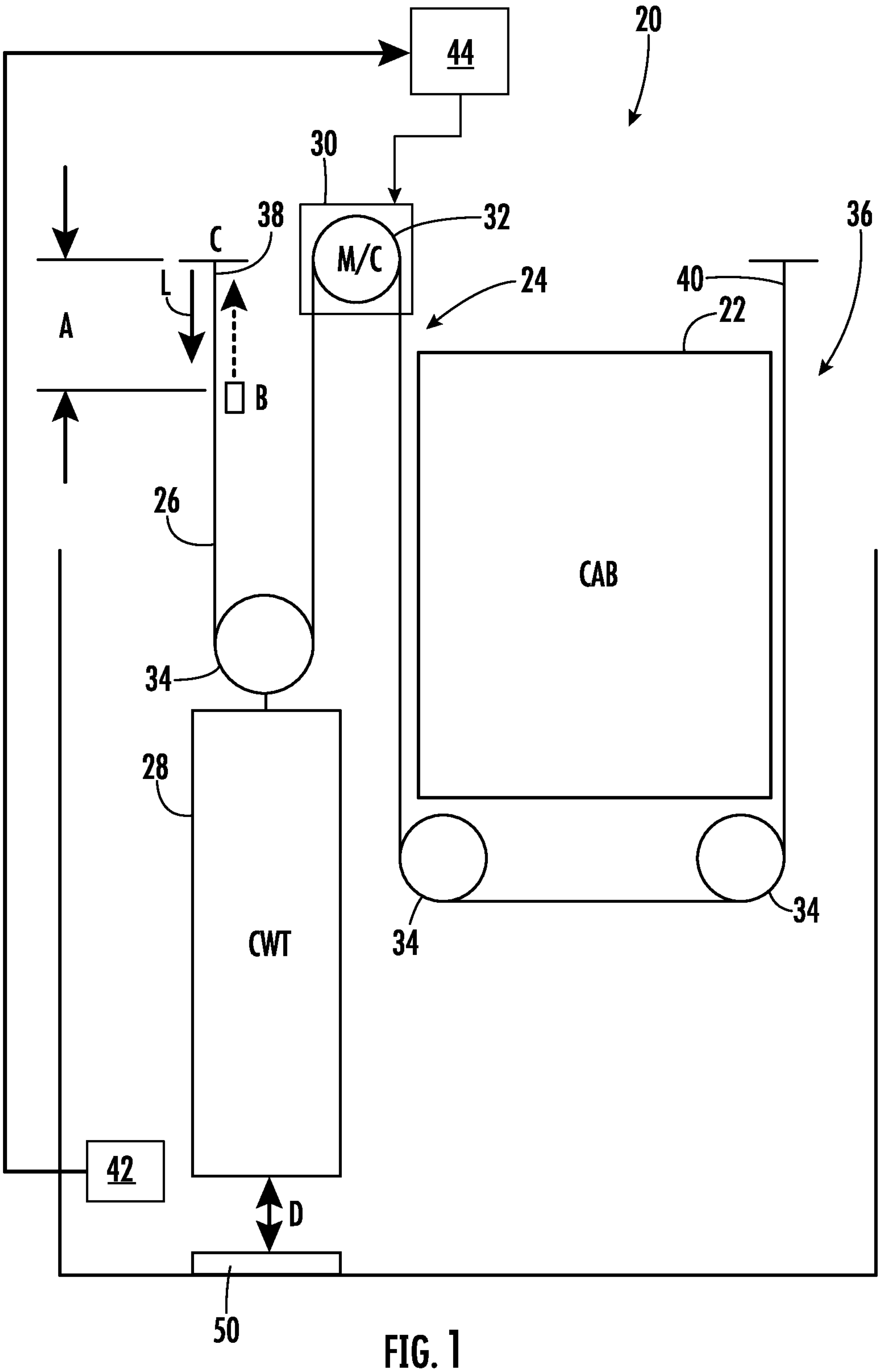
FIG. 1 schematically illustrates selected portions of an elevator system incorporating the monitoring system of the disclosure.

FIG. 1 schematically illustrates selected portions of an elevator system 20. An elevator car 22 is supported by a roping arrangement or suspension assembly 24 that includes a plurality of tension members 26. FIG. 1 shows a 2:1 roped system; however, other roped systems could also be applied, such as a 1:1 roped system for example. The elevator car 22 is coupled to a counterweight 28 by the tension members 26. A machine 30 includes a traction sheave 32 for controlling movement of the elevator car. As the tension members 26 move in response to rotation of the traction sheave 32, the elevator car 22 and counterweight 28 move vertically. The tension members 26 move around sheaves 34 as the elevator car 22 moves between landings or levels. In one example, the tension members 26 comprises coated ropes or coated steel belts.

In one example, an elongation based health monitoring system is provided to monitor the health of the tension members 26 of the elevator system 20. In one example, the health monitoring system is initiated for each new installation of an elevator system 20 within a building. For example, each new installation includes installing at least one tension member 26 that facilitates movement of the elevator car 22 within a hoistway 36. The tension member has a fixed point C and extends along a length L. After installation, a predetermined distance A from the fixed point C is determined. As shown in an example method in FIG. 2, the tension member 26 is marked with an indicator mark B, as indicated at 100, at the predetermined distance A from the fixed point C. In one example, over time, the tension member 26 will stretch by a small amount, which will result in the indicator mark B moving downwardly away from the initial predetermined distance A. Additionally, stretching due to weight will cause a reduction in buffer distance as will be discussed in greater detail below.

Figure 2:
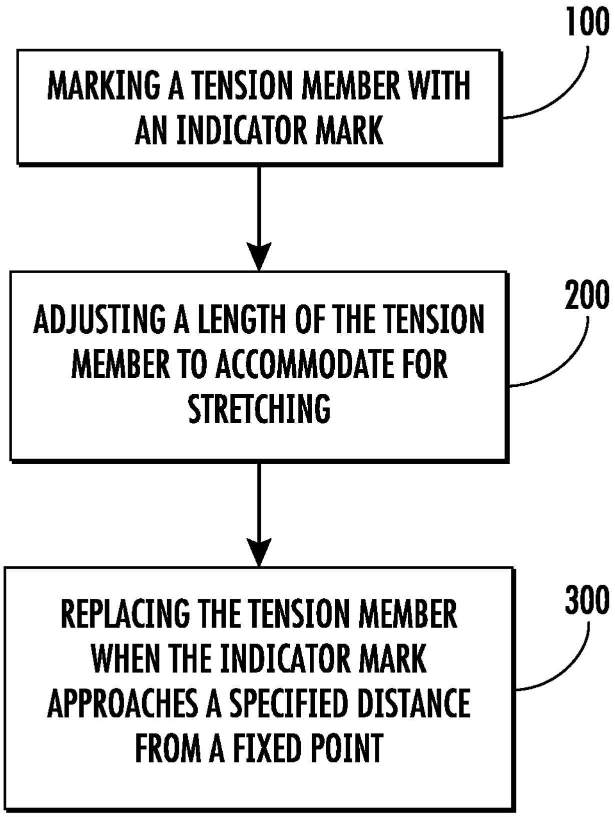
FIG. 2 is a flowchart diagram describing a method of monitoring tension members in an elevator system.

During maintenance or service operations, the length of the tension member 26 is adjusted, i.e. shortened, to accommodate for this stretching as indicated at 200 in FIG. 2. In one example, the tension member 26 is replaced when the indicator mark B approaches a specified distance from the fixed point C during an adjustment service operation as indicated at 300. This provides a visual indication of the health of the tension member 26.

In one example, the fixed point C is at an upper end 38 of the tension member 26. An opposite end 40 of the tension member is also at a fixed point.

In one example, after installation of the tension member 26, an initial predetermined amount of time is allowed to pass. During this predetermined amount of time, the tension member 26 has an initial amount of stretching that occurs due to the type of elevator system, weight of components, etc. In one example, the length of the tension member 26 is adjusted to accommodate the initial stretching before the tension member 26 is marked with the indicator mark B at the predetermined distance from the fixed point C. In one example, the indicator mark B is placed on each tension member 26 after construction stretch adjustment at a specified distance within a range of 300-500 mm, for example. It should be understood that the location of the indicator mark B is dependent upon factors such as the type of tension member, type of elevator system, expected life, etc., for example.

As discussed above, the length of the tension member 26 is reduced during each adjustment to accommodate for the stretching. In one example, the length of the tension member is shortened by cutting the tension member. This brings the indicator mark B closer to the fixed point C during each adjustment cycle. Once the indicator mark B reaches the fixed point C, or approaches a specified distance from the fixed point C, during adjustment, it is a visual indication that the tension member needs to be replaced.

There is a buffer 50 mounted on a bottom of the hoistway 36. In one example, the buffer 50 comprises one or more resilient members, e.g. coiled steel springs, that are located in this area for cushioning purposes. In one example, after installation, an initial buffer distance D is defined between a bottom of the counterweight 28 and a top of the buffer 50. In one example, the buffer distance D can be measured at a specific condition which is position of a can associated with the buffer when on a highest floor. A reduction of the buffer distance D occurs over time as a result of stretching. This reduction can be monitored by a sensor 42 or other device, for example. FIG. 1 shows a schematic representation of the sensor 42. In one example, the sensor 42 is positioned within the hoistway 36 at a location that is adjacent to a bottom of the counterweight 28 to monitor the buffer distance D. In one example, during each adjustment, the length of the tension member 26 is shortened until the bottom of the counterweight 28 returns to the initial buffer distance D.

In one example, the health monitoring system includes one or more processors 44 that are configured to facilitate determining a condition of each of the tension members 26. The processor 44 in the illustrated example includes one or more computing devices and associated memory. The processor 44 is programmed or otherwise configured to use different types of information indicative of the respective conditions of the tension members 26 and a combination of criteria to facilitate a determination of when it is desirable or necessary to remove any one of the tension members 26 from service.

In one example, the sensor 42 communicates information regarding the buffer distance to the processor 44. During maintenance or service operations, this information can be retrieved from the processor 44 such that the length of the tension member 26 can be adjusted until the bottom of the counterweight 28 returns to the initial buffer distance D. Thus, during each adjustment the buffer distance D is brought to the same initial value and the length of belt will be adjusted to bring point B closer to C. Optionally, the buffer distance can be measured manually during each service operation.

In one example, the predetermined distance A from the fixed point C is determined based on a plurality of elevator characteristics. For example, the plurality of elevator characteristics include one or more of length of tension member, expected life of tension member, test data, elevator system layout, and usage pattern. The processor 44 can use this information to facilitate determination of the predetermined distance A from the fixed point C. For example, the predetermined distance A is calculated by a software model considering the characteristics such as the test data, elevator system layout, usage pattern, etc. The processor 44 can be a remote processor, or a processor of the elevator system, or a combination of both. Those skilled in the art who have the benefit of this description will be able to determine the predetermined distance A from the fixed point C for each respective elevator system 20.

The subject disclosure provides for a health monitoring system that has determined a correlation between elongation and tension member residual strength. Testing has shown that elongation of tension members 26 during and after the test has a much better correlation to a loss of breaking force compared to other methods including resistance based. During inspections, when adjustment is necessary to bring the counterweight 28 to its original position, each tension member length is corrected to eliminate accumulated stretch. At that time, the load on each tension member is adjusted according to specification. Correction of each tension member length will cause mark B to move closer to termination for each tension member. At some point the mark B on one or more tension members will reach the termination fixed point C. At this point in time, that tension member(s), along with remaining tension members, should be replaced since one or more tension members have reached a point deemed to be end of life and therefore are to be removed. This subject disclosure solves the issues with resistance based methods, in particular with regard to cost, reliability, accuracy.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method comprising:

marking at least one tension member with an indicator mark at a predetermined distance from a fixed point;

adjusting a length of the at least one tension member to accommodate for stretching;

replacing the at least one tension member when the indicator mark approaches a specified distance from the fixed point;

wherein the predetermined distance from the fixed point is determined based on a plurality of elevator characteristics;

wherein an elevator car is coupled to a counterweight by the at least one tension member, the method further including:

after installation, setting an initial buffer distance between a bottom of the counterweight and buffer mounted at a bottom of a hoistway;

monitoring a reduction of buffer distance as a result of stretching; and during each adjustment, shortening the length of the at least one tension member until the bottom of the counterweight returns to the initial buffer distance.

2. The method of claim 1, including waiting a predetermined time after installation of the at least one tension member during which the at least one tension member has an initial stretching, adjusting the length of the at least one tension member to accommodate for the initial stretching, and subsequently marking the at least one tension member with the indicator mark at the predetermined distance from the fixed point.

3. The method of claim 1, including reducing the length of the at least one tension member during each adjustment and bringing the indicator mark closer to the fixed point.

4. The method of claim 1, wherein the plurality of elevator characteristics include one or more of the length of tension member, expected life of tension member, test data, elevator system layout, and usage pattern.

5. The method of claim 1, wherein during each adjustment, the method includes reducing the length of the at least one tension member which brings the indicator mark closer to the fixed point.

6. The method of claim 1, wherein the fixed point is at an upper end of the at least one tension member.

7. An elevator system, comprising:

an elevator car moveable within a hoistway;

at least one tension member that supports the elevator car and facilitates movement of the elevator car in the hoistway; and an indicator mark located on the at least one tension member at a predetermined distance from a fixed point, and wherein a visual indication of tension member replacement is provided when the indicator mark approaches a specified distance from the fixed point after a tension member length adjustment;

wherein the elevator car is coupled to a counterweight by the at least one tension member, and wherein:

after installation, an initial buffer distance is set between a bottom of the counterweight and a buffer mounted at a bottom of the hoistway;

a reduction of the initial buffer distance as a result of stretching is monitored to provide a current buffer distance; and after each adjustment, a length of the at least one tension member comprises a shortened length and the bottom of the counterweight is at the initial buffer distance.

8. The elevator system of claim 7, wherein the at least one tension member has an initial installation condition, and wherein the indicator mark is marked on the at least one tension member after a predetermined time has passed from the initial installation condition during which the at least one tension member has been adjusted accommodate an initial stretching.

9. The elevator system of claim 7, wherein a length of the at least one tension member is reduced during each adjustment and the indicator mark is brought closer to the fixed point.

10. The elevator system of claim 7, wherein the predetermined distance from the fixed point is determined based on a plurality of elevator characteristics.

11. The elevator system of claim 10, wherein the plurality of elevator characteristics include one or more of length of tension member, expected life of tension member, test data, elevator system layout, and usage pattern.

12. The elevator system of claim 7, wherein after each adjustment the length of the at least one tension member is reduced which brings the indicator mark closer to the fixed point.

* * * * *